(12) United States Patent
Koshikawa et al.

(10) Patent No.: US 9,587,741 B2
(45) Date of Patent: Mar. 7, 2017

(54) PISTON WITH OUT OF PHASE MODE

(71) Applicant: AKEBONO BRAKE INDUSTRY CO., LTD, Chuo-ku, Tokyo (JP)

(72) Inventors: Yuichi Koshikawa, Novi, MI (US); Moira Ann Gaskell, Farmington Hills, MI (US); Jeffrey David Pontius, Wixom, MI (US); Christian Andrew Ball, Waterford, MI (US)

(73) Assignee: AKEBONO BRAKE INDUSTRY CO., LTD., Chuo-Ku, Tokyo (JP)

( * ) Notice: Subject to any disclaimer, the term of this patent is extended or adjusted under 35 U.S.C. 154(b) by 0 days.

(21) Appl. No.: 14/880,590

(22) Filed: Oct. 12, 2015

(65) Prior Publication Data

US 2016/0146345 A1    May 26, 2016

Related U.S. Application Data

(60) Provisional application No. 62/082,884, filed on Nov. 21, 2014.

(51) Int. Cl.
| | | |
|---|---|---|
| *F16D 65/16* | (2006.01) | |
| *F16J 1/00* | (2006.01) | |
| *F16D 65/18* | (2006.01) | |
| *F16D 55/225* | (2006.01) | |
| *F16F 7/108* | (2006.01) | |
| *F16D 125/06* | (2012.01) | |
| *F16D 55/00* | (2006.01) | |

(52) U.S. Cl.
CPC ............ *F16J 1/006* (2013.01); *F16D 55/225* (2013.01); *F16D 65/18* (2013.01); *F16J 1/005* (2013.01); *F16D 2055/0016* (2013.01); *F16D 2125/06* (2013.01); *F16F 7/108* (2013.01)

(58) Field of Classification Search
CPC ............ F16D 65/0006; F16D 65/0018; F16D 2125/06; F16F 7/108
See application file for complete search history.

(56) References Cited

U.S. PATENT DOCUMENTS

| | | | | |
|---|---|---|---|---|
| 4,921,736 A | * | 5/1990 | Miller | ........................ C08J 7/12 428/34.5 |
| 5,478,654 A | * | 12/1995 | Hargis | .................... B32B 15/06 428/457 |
| 5,484,041 A | | 1/1996 | Cadaret et al. | |
| 5,492,202 A | | 2/1996 | Drotar et al. | |
| 5,746,292 A | * | 5/1998 | Tanaka | .................. F16D 55/227 188/250 E |
| 5,887,686 A | * | 3/1999 | Tanaka | .................... F16D 65/00 188/250 E |
| 6,375,279 B1 | | 4/2002 | Cassidy et al. | |

(Continued)

FOREIGN PATENT DOCUMENTS

| | | |
|---|---|---|
| EP | 0872660 A1 | 2/1998 |
| JP | 10-122279 A | 5/1998 |

(Continued)

*Primary Examiner* — Bradley King
(74) *Attorney, Agent, or Firm* — The Dobrusin Law Firm, P.C.; Daniel P. Aleksynas

(57) ABSTRACT

A brake piston comprising: (a) a rear wall, (b) a cylindrical side wall connected to the rear wall, (c) a recess located within the brake piston, (d) an insert located within the recess of the brake piston; and (e) an adhesive connecting the insert to the recess of the brake piston; wherein the insert is made of metal.

20 Claims, 6 Drawing Sheets

(56) References Cited

U.S. PATENT DOCUMENTS

| | | | | |
|---|---|---|---|---|
| 6,382,367 B1* | 5/2002 | Varzescu | ................ | F16D 65/18 |
| | | | | 188/72.7 |
| 8,348,030 B2 | 1/2013 | Alamin et al. | | |
| 8,501,856 B2* | 8/2013 | Correia | ................ | C08G 65/336 |
| | | | | 524/492 |
| 8,561,762 B2* | 10/2013 | Schupska | .............. | B60T 13/745 |
| | | | | 188/370 |
| 2008/0085960 A1* | 4/2008 | Chaves | ................ | B60C 1/0016 |
| | | | | 524/262 |
| 2009/0114490 A1 | 5/2009 | Picot | | |

FOREIGN PATENT DOCUMENTS

| | | |
|---|---|---|
| JP | 2002-213506 A | 7/2002 |
| JP | 2009-36337 A | 2/2009 |

\* cited by examiner

PISTON WITH OUT OF PHASE MODE

FIELD

The present teachings generally relates to a brake piston and more particularly a piston that includes a mass for damping the phase modes of the piston and/or mass damping the piston so that noise, vibration, harshness, squeal, or a combination thereof are substantially reduced and/or eliminated.

BACKGROUND

The present teachings are predicated upon providing an improved disc brake system for use with vehicles. For example, the disc brake system may be used with almost any vehicle (e.g. car, truck, bus, train, airplane, or the like). Alternatively, the disc brake system may be integrated into assemblies used for manufacturing or other equipment that require a brake such as a lathe, winder for paper products or cloth, amusement park rides, wind turbines, the like, or a combination thereof. However, the present teachings are most suitable for use with a passenger vehicle (i.e. a car, truck, sports utility vehicle, or the like). Typical disc brake systems have either a floating caliper or a fixed caliper as discussed below.

Generally, a floating caliper braking system and a fixed caliper brake system include a rotor, a caliper body, a support bracket, and an inboard brake pad and an outboard brake pad located on opposing sides of the rotor. The caliper body further includes a bridge, one or more fingers, and one or more piston bores. The piston bore houses a piston. The piston bore has a bore axis that the piston moves along during a brake apply and a brake release. The piston bore may include a fluid inlet, a closed wall, a front opening, and a cylindrical side wall that has a seal groove located near the front opening. Typically, the fluid inlet is located in the closed wall of the piston bore so that when pressure is applied the fluid will flow into the piston bore. During a pressure apply the fluid will push the piston towards the front opening and into contact with a brake pad and then the brake pad into contact with a rotor. The caliper housing, upon the brake pad contacting the rotor, moves so that the one or more fingers contact the opposing brake pad and then move the opposing brake pad into contact with the opposing side of the rotor so that a braking force is created. A fixed brake system has two or more opposing pistons that move the brake pads simultaneously towards and into contact with a rotor causing a brake apply.

Typical, pistons used in a brake include one open end and one closed end. The open end faces the brake pad and the closed end is in contact with the brake fluid. When brake pressure is applied the fluid pressure increases and the fluid pushes on the closed end of the piston. The fluid moves the open end of the piston axially, with respect to a rotor, into contact with the brake pad so that the brake pad contacts the rotor and creates a braking force. The fluid pressure exerts both an axial force on the piston and a radial force on the piston. The axial forces on the piston move the piston into contact with the brake pad. During a brake apply when the one or more pistons are in contact with the brake pads and the brake pads are in contact with the rotor a frequency is generated by the brake pads and rotor interfaces which causes brake squeal. Examples of attempts to damp phase modes of pistons are disclosed in U.S. Pat. Nos. 5,484,041; 5,492,202; and 8,561,762; U.S. Provisional Patent Application No. 2009/0114490; and Japanese Patent Nos. JP2002/213506 and JP2009/036337 all of which are expressly incorporated by reference herein in their entirety for all purposes.

It would be attractive to have a piston where the mode of the piston is damped, shifted, tuned, changed, or a combination thereof. It would be attractive to have a piston reduces brake squeal, vibration, harshness, noise, or a combination thereof by creating mass damping and reducing vibration at a brake pad and rotor interface. What is needed is a piston that shifts a phase mode of a piston so that the brake pad and rotor interface do not produce noise in range between 2 kHz and 16 kHz. What is needed is an adhesive and insert that goes in a piston and shifts the mode of the piston.

SUMMARY

One possible embodiment of the present teachings includes: a brake piston that includes an insert that changes the phase mode of the piston. The insert may damp the phase modes. Preferably, the insert is connected to the piston by an adhesive that damps movement of the insert within the piston so that the phase mode of the piston is shifted and any noise, vibration, or harshness generated by the brake pad and rotor interfaces are not audible.

One unique aspect of the present teachings envisions a brake piston comprising: (a) a rear wall, (b) a cylindrical side wall connected to the rear wall, (c) a recess located within the brake piston, (d) an insert located within the recess of the brake piston; and (e) an adhesive connecting the insert to the recess of the brake piston; wherein the insert is made of metal.

Another unique aspect of the present teachings envisions a brake system comprising: (a) a support bracket, (b) a caliper in communication with the support bracket, the caliper including: one or more piston bores with each piston bore including one or more pistons, wherein the piston includes: (i) a rear wall, (ii) a cylindrical side wall connected to the rear wall, (iii) a recess located within the brake piston, (iv) an insert located within the recess of the brake piston; and (v) an adhesive connecting the insert to the recess of the brake piston; wherein the adhesive has elastic characteristics so that the adhesive permits the insert to move relative to the piston during a brake apply, and wherein the insert is made of metal and the piston is made of a phenolic material.

The present teachings provide a piston where the mode of the piston is damped, shifted, or both. The present teachings provide a piston reduces brake squeal, vibration, harshness, noise, or a combination thereof. The present teachings provide a piston that shifts a frequency mode of a piston so that the brake pad and rotor interfaces do not produce noise in range between 2 kHz and 16 kHz. The present teachings provide an adhesive and insert that goes in a piston and shifts the mode of the piston.

DETAILED DESCRIPTION

Figure 1:
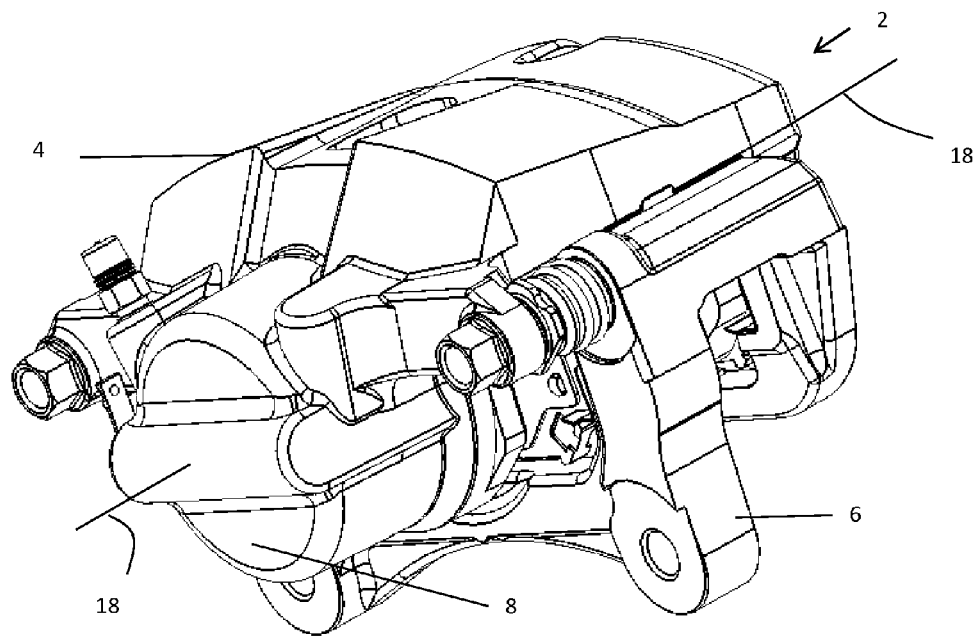
FIG. 1 illustrates a perspective view of a brake system.

The explanations and illustrations presented herein are intended to acquaint others skilled in the art with the teachings, its principles, and its practical application. Those skilled in the art may adapt and apply the teachings in its numerous forms, as may be best suited to the requirements of a particular use. Accordingly, the specific embodiments of the present teachings as set forth are not intended as being exhaustive or limiting of the teachings. The scope of the teachings should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. Other combinations are also possible as will be gleaned from the following claims, which are also hereby incorporated by reference into this written description. The present teachings claim priority to U.S. Provisional Patent Application No. 62/082,884, filed on Nov. 21, 2014, the teachings of which are expressly incorporated by reference herein for all purposes.

The present teachings are predicated upon providing an improved disc brake system and caliper for use with vehicles. For example, the caliper and piston may be used with almost any vehicle (e.g. car, truck, bus, train, airplane, or the like). Alternatively, the caliper and piston may be integrated into components used for manufacturing or other equipment that require a brake such as a lathe, winder for paper products or cloth, amusement park rides, or the like. However, the present teachings are most suitable for use with a passenger vehicle (i.e. a car, truck, sports utility vehicle, or the like).

Generally, a braking system includes a rotor and a caliper body. The caliper body functions to move one or more pistons to create a braking force. The caliper body may be a fixed caliper body. The caliper body may be sliding caliper body (i.e., floating caliper). The caliper body may be directly connected to a knuckle of a vehicle or a mechanical component. The caliper body may be connected to or in communication with a support bracket. The support bracket may function to connect the caliper to a component (e.g., a knuckle). The support bracket may function to allow the caliper to move. The support bracket may function to house one or more brake pads and preferably two or more opposing brake pads. The caliper body may include an inboard brake pad and an outboard brake pad that are on opposing sides of the rotor. The caliper body may include a bridge, one or more fingers, one or more piston bores, or a combination thereof.

The piston bores each house a piston. The piston bores may include a fluid inlet, a closed wall, a front opening, and a cylindrical side wall that includes an annular groove (i.e. seal groove) located near the front opening. Each piston bore includes a piston bore axis and the pistons move substantially axially along the piston bore axis. A seal may be located in the annular groove and form an interference fit with the piston. The fluid inlet may be in the closed wall and may allow for fluid to enter the piston bore so that the piston is moved towards the front opening. The piston may be mechanically moved. For example, the piston may be moved by an actuator, driver, a mechanical motor rotating a screw, or a combination thereof. Preferably, the piston may be driven by a fluid. More preferably, the piston may be driven by a brake fluid. The rear opening may allow the brake fluid to move the piston towards the front opening and into contact with a brake pad.

The brake pads may be axially moved into contact with the rotor so that a braking force is created. The brake pads may function to contact a moving component (e.g., a rotor) and create friction on the moving component so that the moving component is slowed and/or stopped. Preferably, the brake pads contact a rotor and create a friction force with the rotor so that the rotor is slowed and/or stopped causing a vehicle or component to be slowed and/or stopped. The brake pads may include one or more pressure plates, one or more pieces of friction material, or both. One piston may contact each brake pad. Multiple pistons may contact each brake pad. A piston may axially move one brake pad, along the piston bore axis, and fingers may axially move an opposing brake pad, along a piston bore axis, to create a friction force.

The piston may include a body portion (e.g., sliding surface, cylindrical wall, side wall). The body portion may be any shape (e.g. square, oval, triangular) capable of sliding inside a piston bore. Preferably, the body portion is cylindrical. More preferably, the body portion includes a side wall. The side wall may have a wall thickness. The wall thickness may be any thickness that resists failure of any part of the side wall. Preferably, the thickness is thick enough that the axial forces and the radial forces applied during a brake apply do not damage the side wall of the piston.

The body portion may form the outside wall of the piston. The body portion may include a first pocket (i.e., a first recess) and a second pocket (i.e., a second recess). Pocket and recess as discussed herein are used interchangeably. The first pocket may be on a first side of the piston and the second pocket may be on a second side of the piston. The first pocket and the second pocket may be on opposing sides of the piston. The first pocket may face the front opening in the piston bore. The second pocket may face the bottom of the piston bore. The second pocket may be located proximate to the rear wall. The second pocket may be a concave portion of a wall. The body portion may have a wall thickness adjacent to the first pocket and the second pocket. The thickness of the walls adjacent to the first pocket and the second pocket may be the same. The first pocket and the second pocket may be separated by a wall. Preferably, the first pocket and the second pocket are separated by the rear wall.

The first pocket and the second pocket may have a volume. The volume of the first pocket and the second pocket may be the same. The volume of the first pocket and the second pocket may be different. Preferably, the volume of the pockets will be large enough that the piston will function properly and will be resistant to failure. The volume of the first pocket may be greater than the volume of the second pocket. The volume of the first pocket, the second pocket, or both may be sufficiently large that the first pocket, the second pocket, or both may hold one or more inserts. The volume of the first pocket, the second pocket, or both may be sufficiently large that the first pocket, second pocket, or both may be filled with material to shift and/or change the modes of the piston (e.g., damp, deaden, check or stifle energy, or absorb movement).

The first pocket and the second pocket may have a depth. The depth of the first pocket and second pocket may be any depth so that any of the walls discussed herein will not fail when subjected to axial forces and/or radial forces. The depth of the first pocket and the second pocket may be substantially the same. The depth of the first pocket may be larger than the depth of the second pocket or vice versa. The depth of the first pocket, the second pocket, or both may be sufficiently large so that the first pocket, the second pocket, or both may include an insert, be filled with a material, or both. The depth of the pocket may determine the center of gravity when an insert is placed within the piston. The depth of the pocket may shift the center of gravity of the piston. The depth of the pocket may affect the phase mode of the piston (e.g., frequency mode).

The cavity may function to receive adhesive, a portion of the insert, a base of the insert, or a combination thereof. The cavity may be a bottom wall within the recess (or pocket) of the piston. The cavity may be a concave portion in the bottom wall within the recess of the piston. The cavity may be wholly located within the bottom wall of the piston. The cavity may receive a portion of the insert and the adhesive and retain the adhesive within the pocket so that the adhesive does not extend outside of the cavity or extend along the sidewalls of the insert. The cavity may be one or more concave portions within the pocket of the piston. The cavity may be complementary to the shape of the insert. The cavity may be formed by one or more retaining steps. The cavity may be formed substantially in the center of the pistons. The cavity may be an annular ring outside of the center of the bottom wall of the piston. For example, if the bottom wall of the piston includes a projection that extends substantially in the center the cavity may be an annular channel around the projection. The cavity may be one continuous shape. The cavity may be a plurality of cavities that receive flowing or expanding adhesive to prevent the adhesive from extending around the annular walls of the insert. The cavity may assist in centering an insert within the piston. The cavity may align the adhesive and the insert relative to each other. The cavity may have an area that is substantially the same area as the bottom wall of the recess of the piston. Preferably, the cavity has an area that is less than the bottom wall of the recess. The cavity may be formed by one or more retaining steps (i.e., the depth of the cavity may vary as the cavity extends from the center outward.

The retaining step may function to create an area where adhesive may flow so that the adhesive does not move from the bottom of the insert to a side wall of the insert. The retaining step may form the cavity. The retaining step may be one or more steps. The retaining steps may be a plurality of steps. The retaining steps may step downward as the steps extend from an outer edge towards a center of the piston. The retaining steps may step downward as the steps extend from the center of the piston towards a sidewall of the piston. The retaining steps, in a cross section, may have a horizontal wall and a vertical wall that are connected together and form the cavity. The retaining steps may form an annular ring that extends from the sidewall of the piston and terminates in a cavity. The retaining steps may step down one or more times, two or more times, or even three or more times. The retaining steps may prevent adhesive from extending out from a cavity to a sidewall of the piston. The retaining steps may align the insert within the recess of the piston. The retaining steps may mirror a shape of the insert. The retaining steps may form an annular ring. The retaining steps may have intermittent gaps so that the sidewall extends the full length of the recess or pocket. The retaining steps may be located around a projection. Preferably, when a projection is present the piston is free of retaining steps.

The projection may function to extend into the insert. The projection may function to retain the insert within the piston, to center the insert within the pocket of the piston, maintain the adhesive in communication between the insert and the piston. The projection may extend vertically upward from a bottom of the piston. The projection may extend upward from a bottom so that one or more cavities are formed between the projection and the sidewall of the piston. The projection may be shaped like a circle, square, oval, star, diamond, or any other shape that retains the insert in place, the adhesive in place, or both. The projection may have a shape that is complementary to the shape of the insert or an indentation in the bottom of the insert. The projection may prevent radial movement towards a sidewall of the piston (i.e., outward the sidewall of the piston in a direction perpendicular to the axis of the piston). The projection may extend into a base of the insert. The projection may assist in retaining adhesive within the indentation in the bottom of the insert. The projection may be surrounded by one or more steps that are located on a bottom of the insert, a base of the insert, or both. The projection may be one portion that extends from a bottom of a recess of the pocket. The projection may be a plurality of portions that extend from a bottom of the recess of the pocket. Preferably, the projection is a single portion that extends from a bottom of the recess of the pocket.

The piston may have a length. The length of the piston may be any length suitable so that during a brake apply the piston moves into contact with a friction material and a braking force is created. The length of the piston may vary from piston to piston. For example, a truck may have a longer piston than a compact car. The length of the piston may be about 15 cm or longer. Preferably, the length of the piston may be about 25 cm or longer. More preferably, the length of the piston may be about 35 cm or longer. The piston may have a diameter. The diameter of the piston may vary from piston to piston. For example, a truck may have a piston with a larger diameter than that of a compact car. The diameter of the piston may be about 8 mm or more. Preferably, the diameter of the piston may be about 15 mm or more. More preferably, the diameter of the piston may be about 20 mm or more.

The first pocket and the second pocket may be separated by an internal wall. The internal wall may have a thickness. Preferably, the thickness of the internal wall may be thick enough so that the wall does not fail when radial forces are applied. The internal wall of the piston may be the rear wall. The rear wall may be the bottom of the first pocket, the second pocket, or both. The rear wall may connect to the side wall. The side wall may surround the rear wall. The rear wall may be concave so that the second pocket is formed. The rear wall may be sufficiently strong so that the rear wall when subjected to pressure by brake fluid moves the piston axially.

The piston may be made of any material that is impermeable to brake fluid. The piston may be made of any material that can withstand substantial forces in the axial direction and the radial direction, relative to the rotor, so that the piston resists failures. The piston may be made of metal. For example, the piston may be made of steel, stainless steel, titanium, aluminum, carbon steel, or a combination thereof. The piston may be made of a material that may be molded or any plastic material that can be molded, so that the strength to resist radial forces and/or axial forces does not degrade in the presence of brake fluid. Preferably, the piston may be injection molded. The piston may be free of elastic material and/or elastic characteristics. Preferably, the piston may be made of a glass fiber mold, a thermoset polymer, a thermoplast polymer, or a combination thereof, wherein the polymeric material may be reinforced with fibers such as nylon. More preferably, the piston may be made from a phenolic resin or Acrylonitrile butadiene styrene.

A suitable material may exhibit one or more of the following properties. Preferably, a suitable material will exhibit all of the following properties. A suitable material may have a molded gravity before baking of about 0.5 or greater, preferably of about 1.0 or greater, or more preferably of about 2.0 or greater measured using ASTM D792 (i.e. between about 2.099 to about 2.112). A suitable material may have a molded gravity before baking of about 5.0 or less, preferably of about 4.0 or less, or more preferably of about 3.0 or less measured using ASTM D792. A suitable material may have a molded gravity after baking of about 0.5 or greater, preferably of about 1.0 or greater, or more preferably of about 2.0 or greater measured using ASTM D792 (i.e. between about 2.078 to about 2.091). A suitable material may have a molded gravity after baking of about 5.0 or less, preferably of about 4.0 or less, or more preferably of about 3.0 or less measured using ASTM D792.

A suitable material may have a post-baked Rockwell Hardness of about 50 E Scale or more, preferably of about 60 E Scale or more, or more preferably of about 70 E Scale or more measured using ASTM D785 (i.e. between about 104.5 and about 105.8 E Scale). A suitable material may have a post-baked Rockwell Hardness of about 200 E Scale or less, preferably of about 150 E Scale or less, or more preferably of about 125 E Scale or less measured using ASTM D785. A suitable material may have a post-baked Compressive Strength of about 150 MPa or more, preferably about 200 MPa or more, or more preferably about 250 MPa or more measured using ASTM D695 (i.e. between about 274 to about 283 MPa). A suitable material may have a post-baked Compressive Strength of about 500 MPa or less, preferably about 400 MPa or less, or more preferably about 300 MPa or less measured using ASTM D695. A suitable material may have a post-baked Tensile Strength of about 150 MPa or less, preferably about 125 MPa or less, or more preferably about 100 MPa or less measured using ASTM D695 (i.e. between about 60.7 to about 71.0 MPa). A suitable material may have a post-baked Tensile Strength of about 30 MPa or more, preferably about 40 MPa or more, or more preferably about 50 MPa or more measured using ASTM D695.

A suitable material may have a post-baked Flexural Strength of about 50 MPa or more, preferably of about 70 MPa or more, or more preferably of about 85 MPa or more measured using ASTM D790 (i.e. between about 101.1 to about 107.5 MPa). A suitable material may have a post-baked Flexural Strength of about 200 MPa or less, preferably of about 150 MPa or less, or more preferably of about 125 MPa or less measured using ASTM D790. A suitable material may have a post-baked Flexural Modulus of about 10 GPa or more, preferably of about 20 GPa or more, or more preferably of about 25 GPa or more measured using ASTM D790 (i.e. between about 23.6 to about 24.4 GPa). A suitable material may have a post-baked Flexural Modulus of about 50 GPa or less, preferably of about 40 GPa or less, or more preferably of about 30 GPa or less measured using ASTM D790. A suitable material may have a Deflection Temperature of about 200° C. or greater, preferably of about 225° C. or greater, more preferably of about 250° C. or greater measured using ASTM D648 (i.e. about 275° C. or greater).

A suitable material may have a post-baked Water Aging percentage of weight change of about 0.0005 percent or more, preferably of about 0.005 percent or more, or more preferably of about 0.01 percent or more measured using ASTM D570 for 24 hours at 22-24° C. (i.e. about 0.03 percent). A suitable material may have a post-baked Water Aging percentage of weight change of about 1.0 percent or less, preferably of about 0.5 percent or less, or more preferably of about 0.05 percent or less measured using ASTM D570 for 24 hours at 22-24° C. A suitable material may have a post-baked Water Aging percentage of volume change of about 0.0005 percent or more, preferably of about 0.005 percent or more, or more preferably of about 0.01 percent or more measured using ASTM D3604 for 24 hours at 22-24° C. (i.e. between about 0.02 and 0.06 percent). A suitable material may have a post-baked Water Aging percentage of volume change of about 2.0 percent or less, preferably of about 1.0 percent or less, or more preferably of about 0.08 percent or less measured using ASTM D3604 for 24 hours at 22-24° C.

A suitable material may have a post-baked impact strength of about 5.0 J/m or more, preferably about 10 J/m or more, or more preferably about 15 J/m or more measured using ASTM D256 (i.e. about 19.7 J/m). A suitable material may have a post-baked impact strength of about 50 J/m or less, preferably about 40 J/m or less, or more preferably about 30 J/m or less.

The piston has a density and mass. The density and mass may be less than a piston of similar size made of metal. The density and mass of the piston may be 10 percent or less, 20 percent or less, 50 percent or less, or even about 70 percent or less than a piston of a similar size made of metal. One or more inserts may be placed within one or more pockets of the piston, adhered within one or more pockets of the piston, or both. The one or more inserts may vary the mass, the density, or both of the piston.

The one or more inserts may have a mass, a density, or both that is more than the density, mass, or both of the piston. Preferably, the one or more inserts may have a mass that is less than the mass of the piston, but the density of the insert is greater than the density of the piston material. More preferably, the density of the material of the insert is higher than the density of the material of the piston, but the mass of the piston is greater than the mass of the insert. Preferably, the insert is not overmolded within the piston. The insert may not be locked within the pocket of the piston by a cap extending over the insert and the cap connecting to a wall of the piston locking the insert within the piston. The insert and piston may be maintained as two substantially discrete pieces with a portion attached together. The mass of the piston and the mass of the insert form a ratio relative to each other.

The mass of the piston relative to the mass of the insert may be about 1.5:1 or more, about 2:1 or more, about 3:1 or more. The mass of the piston relative to the mass of the insert may be about 7:1 or less, about 6:1 or less, or about 4:1 or less.

The insert may function to fill all or a portion of one or more pockets of the piston. The insert may function to shift a mode of the piston (e.g., frequency mode). The mode or phase mode as is discussed herein is a shape of the piston at a resonant frequency. The insert may function to damp the mode of the piston. The insert may lower the mode of the piston so that squeal is not produced, vibrations are not created between the rotor and a brake pad, audible noise is not generated, or a combination thereof. The insert may damp or eliminate the mode of the piston within a range of about 0 kHz to about 16 kHz, preferably a range of about 5 kHz to about 15 kHz, and more preferably about 7 kHz to about 12 kHz. The insert may damp the mode so that a frequency generated by the brake pads within a range is damped by the piston and the piston, rotor, brake pad, piston/brake pad interface, rotor/brake pad interface, or a combination thereof do not generate noise, vibration, harshness, squeal, or a combination thereof that are detectable by the occupant. The damping effect of the piston assembly may be tuned.

The insert size, shape, mass, density, or a combination thereof may be varied so that the frequency range damped may be varied (e.g., the piston may be tuned by changing the insert or adhesive). The adhesive type, crystallinity, amorphous amount, elasticity, or a combination thereof may be varied so that the frequency range damped may be varied (i.e., the piston may be tuned by varying adhesive characteristics). The piston may be tuned by changing one or more of the insert characteristics discussed herein, one or more of the adhesive characteristics and/or components, or a combination of both. The insert may damp high frequency movement of the brake pads relative to the rotor so that movement is substantially reduced and or eliminated. The insert may substantially fill one or more pockets of the piston.

The insert may include one or more steps that may form a space between a bottom of the piston, a side wall of the piston, or both. The one or more steps may function to prevent adhesive from flowing, moving, contacting, or a combination thereof a sidewall of the piston, the insert, or both. The one or more steps may be complementary to the one or more retaining steps in the piston. The one or more steps may form a base and a cap. The one or more steps may extend inward so that a base is smaller than a cap. The one or more steps may extend outward so that the cap is smaller than the base. The one or more steps may be a plurality of steps. The one or more steps may be annular. The one or more steps may extend around less than an entire circumference of the insert. For example the steps may form indentations around an outside of the insert. The one or more steps may form an annular groove, ring, or both. The one or more steps may be sized and shaped so that adhesive is prevented from flowing up the sides of the insert. The steps may be sufficiently large to create a region that receives adhesive and prevents adhesive from moving from the desired area (e.g., between a bottom wall of piston and bottom wall of an insert). The one or more steps may form intermittent indentations in an outer wall of the insert. The one or more steps may create a region that receives excess adhesive, flowing adhesive, adhesive extending towards a sidewall, or a combination thereof. The one or more steps may include a vertical portion and a horizontal portion that are connected together. The one or more steps may form a base and a cap.

The base may function to create an area that adhesive may flow so that the adhesive is prevented from contacting a sidewall of the insert, the piston, or both. The base may form a recess under a cap to collect or receive excess adhesive, flowing adhesive, or both. The base may function to receive a projection, fit within a cavity, or both. The base may contact the bottom wall of the recess. The base may from a complementary fit with the recess in the piston. The base may substantially prevent the insert from moving within the piston. The base may align the insert within the piston. The base may be formed by one or more steps. The base may be located radially inside of retaining steps in the piston. The base may create a stem and the cap may create an upper portion so that the insert is generally mushroom shaped. The base may be held in communication with the piston by an adhesive that extends between the base and the piston.

The cap may function to extend above the base, the retaining step, the step, or a combination thereof. All or a portion of the cap may extend above a recess of the insert. The cap may assist in forming a recess between the wall of the piston and the bottom wall of the piston. The cap may have a larger size and shape then the base. The cap may be located a distance from the sidewall of the piston so that a gap discussed herein is formed. The cap may be free of steps, retaining steps, cavities, indentations, or a combination thereof. The cap may be free of contact with adhesive. The cap may move during a braking event and damp vibrations of the piston. The cap may move within the cavity without contacting the walls of the cavity. The cap may be made of the same material as the base. The cap and base may be made of two different materials.

The insert may be made of any material with a density higher than that of the piston. The insert may have a mass that is higher than the mass of the piston. Preferably, the mass of the insert is less than the mass of the piston. The insert may vary the center of gravity of the piston. The center of gravity along a length of the piston (i.e., piston and insert) may be close to the bottom wall of the piston (i.e., within about 1 cm or less, about 5 mm or less, or about 3 mm or less). The center of gravity may be changed by changing the length or diameter of the piston. The insert may have a length relative to the length of the pocket. The insert may substantially fill the pocket so that during a braking event the insert damps the piston and noise created by the piston is substantially reduced or completely eliminated in the audible range. The insert may be the same length as the pocket or less, about 90 percent or less, about 70 percent or less, or about 60 percent or less of the length of the pocket. The insert may have a length that is about 20 percent or more, about 30 percent or more, about 40 percent or more the length of the pocket. Preferably, the insert has a length that is between about 30 percent and about 50 percent the length of the pocket and more preferably about 35 percent and 45 percent the length of the pocket. The center of gravity of the insert within the piston may be located proximate to a closed end of the piston. Preferably, the center of gravity of the insert within the piston is located opposite the open end of the piston. The center of gravity of the insert, the piston assembly, or both may provide mass damping to the brake system. The center of gravity may be varied by varying the density, shape, or both of the insert.

The insert may have a sufficiently large density so that during a brake apply the insert damps or eliminates movement of the piston; reduces or eliminates noise created by piston movement; or both. The density of the insert may be about 3 g/cm$^3$ or more, about 4 g/cm$^3$ or more, about 5 g/cm$^3$ or more, about 6 g/cm$^3$ or more, or even about 8 g/cm$^3$ or more. The density of the insert may be about 12 g/cm$^3$ or less, about 10 g/cm$^3$ or less, or about 9 g/cm$^3$ or less. Preferably, the density of the insert is greater than the density of the piston. A gap may be present between the outer perimeter of the insert and an inner perimeter of the recess, the piston, or both.

The gap may function to allow the insert to move within the piston. The gap may allow the insert to move relative to the piston. The gap may allow the insert to act as a counter balance to the piston. For example, as the piston moves in a first direction the piston moves the insert in a first direction and then the piston shifts to a second direction and a delay in the insert moving into the gap causes the insert to collide with the piston damping the movement of the piston. The gap may be sufficiently large that adhesive is located between the piston and the insert. The gap may be substantially free of adhesive. The gap may be substantially the same size all of the way around a perimeter of the insert. The gap may vary around the perimeter of the insert. Preferably, the insert is substantially centered within the piston so that the gap is substantially constant (i.e., an annular gap is formed). The gap may be about 0.01 mm or more, about 0.05 mm or more, about 0.1 mm or more, about 0.2 mm or more, or even about 0.3 mm or more. The gap may be about 1 mm or less, about 0.5 mm or less. Preferably, the gap is sufficiently large so that the insert can move within the pocket without the piston and insert coming into contact. Preferably, the gap is an annular gap that is sufficiently constant around the entire outer circumference of the insert (and inner circumference of the pocket of the piston). The gap may vary along a length, height, or both of the insert. The gap may vary due to a draft angle, taper, or both of the piston. The insert may taper to match the draft angle, the taper, or both of the piston. The gap may vary along the height, length, perimeter, or a combination thereof of the insert, the recess, the piston, or a combination thereof. The gap may allow for absorption of vibration. The gap may allow for absorption of vibration through adhesive. The gap may be free of adhesive around the annular sidewalls of the piston, the insert, or both. The gap may allow the insert to move relative to the piston. The gap may be sufficiently large so that the insert may move within the piston without contacting a wall of the piston.

The piston assembly (i.e., insert, piston, and adhesive) may function to absorb vibrations generated from the brake pad and rotor interfaces. The piston assembly may function to provide mass damping to the brake system, the brake pad and rotor interface, or both. The piston assembly may separate vibrations created by the brake pad and rotor interface to a greater area, a greater mass, or both relative to a piston assembly that does not include an insert.

The piston may be free of elastic material and/or elastomeric characteristics. The insert may be made of a polymer. Preferably, the insert is made of metal. More preferably, the insert may be made of steel, iron, or both. The insert may have a shape that substantially mirrors the pocket of the piston that holds the insert. The insert may have a bottom wall that mirrors the shape of the pocket so that the bottom wall and that pocket are connected, fit with each other, or both. The bottom wall of the insert and the rear wall of the brake pad may have a complementary shape. The insert may have a smooth outer surface. The insert may be cylindrical shaped. The insert may have a cylindrical shaped outer wall. The insert may include one or more indentations.

The indentations may be periodically located around an outer surface of the insert. The indentations may be equally spaced apart. The indentations may span a length of the insert. The indentations may extend from a first end to a second end of the insert. The indentations may be wholly located between ends of the insert without extending to one or both ends of the insert. The indentations may be channels formed within the outer surface of the insert, in a wall of the insert, or both. The indentations may increase a surface area of the insert relative to an insert without indentations. The indentations may hold an adhesive, retain an adhesive, or both. The indentations may form a pocket for excess adhesive to travel into. The inset may be free of indentations for holding adhesive.

The adhesive may function to connect the insert to the piston. The adhesive may function to damp vibration of the piston and/or insert, modes of the piston and/or insert, frequency of the piston and/or insert, movement of the piston and/or insert, movement of the insert relative to the piston, or a combination thereof. The adhesive may function to retain the insert within the pocket of the piston. The adhesive may connect the insert tot the piston by the adhesive being located only on the bottom of the insert and an upper wall of the piston within the pocket. The adhesive may function to prevent a transfer of vibration through the piston, reduce vibration from the brake pad and rotor interface, distribute vibrations created from the rotor and brake pad interface, or a combination thereof. The adhesive may be a thermoset. The adhesive may not soften, reliquefy, or flow upon heating during a brake apply. The adhesive upon hardening may retain some elastic characteristics. The adhesive may cure at room temperature. The adhesive may cure with an activator. The adhesive may activate without exposure to temperature, humidity, fluids, or a combination thereof. The adhesive may allow movement of the insert within the piston. The adhesive may assist in damping vibrations traveling through the piston. The adhesive may assist is shifting the mode of the piston. The adhesive may assist in reducing and/or eliminating squeal, noise, vibration, harshness, or a combination thereof. The adhesive may have some elastomeric characteristic so that the insert may move relative to the piston. For example, the base of the insert may be adhered within the recess (or pocket) of the piston and the insert may move relative to the inner walls so that the insert damps vibration of the piston. The adhesive may be sufficiently elastic that the insert can rock back and forth within the pocket of the piston. The adhesive may include elastic or elastomeric material. Preferably, the adhesive exhibits elastic characteristics.

The adhesive may be amorphous or low crystallinity. The crystallinity of the adhesive may be about 20 percent by weight or less, about 15 percent by weight or less, about 10 percent by weight or less, or even about 5 percent by weight or less measured using differential scanning calorimetry. The adhesive if amorphous may be a blend of one or more polymers. The adhesive may include acrylonitrile butadiene styrene (ABS), ethylene propylene diene monomer (EPDM), Butadiene Rubber, polyisoprene, poly(methyl methacrylate (PMMA), or a combination thereof. The adhesive may have a low glass transition temperature. The glass transition temperature may be about 0° C. or less, about −10° C. or less, or about −30° C. or less. The adhesive may be cross-linked. The adhesive may be a thermoset. Examples of thermosets are a thermoplastic polyurethane (TPU). The adhesive may be an atactic polymer. The adhesive may be a copolymer. The adhesive may include a copolymer having a concentration of about 10 percent by weight or more, about 20 percent by weight or more, or even about 30 percent by weight or more.

The adhesive may be a one part adhesive or a two part adhesive. The adhesive may include one or more monomers that react to form a durable bond with the substrate (e.g., a metal and a plastic). The adhesive may bond dissimilar materials together. Preferred adhesives include one or more acrylates, epoxies, methacrylates, acrylic acids, methacrylic acids, methacrylate esters, acrylate esters, urethanes, epoxy acrylates. The adhesive may include on or more curing agents suitable for curing the monomer or oligomer. An example of a commercially available curing agent that may be used is Loctite 7380. The adhesive may be a single cure adhesive or a dual cure adhesive system. For example, the adhesive may be a dual cure adhesive system that includes an adhesive and an activator. When one or both surfaces to be joined (one or both facing surfaces of a lap shear specimen) are coated with the activator, the initial cure may be accelerated so that fixture time is reduced. The adhesive, when fully cured) may be characterized by one or any combination of the following: Tensile modulus measured using ISO 527-2 of about 200 N/mm$^2$ or more, about 500 N/mm$^2$ or more, about 750 N/mm$^2$ or more, or about 1000 N/mm$^2$ or more. Tensile modulus measured using ISO 527-2 of about 2000 N/mm$^2$ or less, about 1700 N/mm$^2$ or less, about 1500 N/mm$^2$ or less, or about 1400 N/mm$^2$ or less. A tensile strength at failure measured using ISO 527-2 of about 0 N/mm$^2$ or more, about 2 N/mm$^2$ or more, about 4 N/mm$^2$ or more, about 8 N/mm$^2$ or more, about 10 N/mm$^2$ or more, or even about 15 N/mm$^2$ or more.

The adhesive preferably forms a strong and durable bond with metal and phenolic substrates. For example, the strength of a lap shear sample after full cure at 22° C. measured according to ISO 4587 with a bondline of 0.05 mm may be about 2 N/mm$^2$ or more, 5 N/mm$^2$ or more, 8 N/mm$^2$ or more, or 10 N/mm$^2$ or more. The adhesive may have a sufficiently low viscosity so that the adhesive can easily be applied to the gap with excess adhesive flowing into an over fill compartment. The adhesive may have a Brooksfield viscosity at 25° C. of about 1,000,000 mPa*s or less, about 600,000 mPa*s or less, about 400,000 mPa*s or less, or about 200,000 mPa*s or less. The adhesive may have a Brooksfield viscosity at 25° C. of about 2,000 mPa*s or more, about 10,000 mPa*s or more, about 20,000 mPa*s or more, or about 40,000 mPa*s or more.

The adhesive is preferably curable at low temperatures so that treating of the part is minimized. For example, the adhesive may be characterized by a cure temperature below which full cure is not achieved with 24 hours (as defined by 95 of maximum strength on steel lap shear samples with a gap of about 0.05 mm according to ISO 4587). The cure temperature preferably is 80° C. or less, more preferably 50° C. or less, and most preferably 35° C. or less. The cure temperature may be about 0° C. or more, about 10° C. or more, or about 15° C. or more. The adhesive preferably has a short fixture time at room temperature. The fixture time may be defined by the time for achieving a shear strength of about 0.1 N/mm$^2$ (when tested on steel lap shear samples according to ISO 4587.) The fixture time preferably is about 60 min or less, more preferably about 15 min or less, most preferably about 3 min or less. The fixture time may be about 1 second or more, about 5 seconds or more, or about 15 seconds or more.

The adhesive may include dimethacrylate ester in an amount of about 10 percent by weight or more, about 20 percent by weight or more, or about 30 percent by weight more. The adhesive may include dimethacrylate ester in an amount of about 80 percent by weight or less, about 70 percent by weight or less, or about 60 percent by weight or less. The adhesive may include a methacrylate monomer in an amount of about 5 percent by weight or more, about 7 percent by weight or more, or even about 10 percent by weight or more. The adhesive may include a methacrylate monomer in an amount of about 50 percent or less, about 40 percent or less, about 30 or less. The adhesive may include 2-Hydroyethyl methacrylate in an amount of about 5 percent by weight or more, about 7 percent by weight or more, or even about 10 percent by weight or more. The adhesive may include 2-Hydroyethyl methacrylate in an amount of about 50 percent by weight or less, about 40 percent by weight or less, about 30 percent by weight or less. The adhesive may include polyurethane methacrylate resin in an about of about 1 percent by weight or more, about 3 percent by weight or more, or about 5 percent by weight or more. The adhesive may include polyurethane methacrylate resin in an about of about 30 percent by weight or less, about 20 percent by weight or less, or about 10 percent by weight or less. The adhesive may include hydroxyalkyl methacrylate in an amount of about 0.5 percent by weight or more or about 1 percent by weight or more. The adhesive may include hydroxyalkyl methacrylate in an amount of about 20 percent by weight or less, about 10 percent by weight or less, or about 5 percent by weight or less. An example of an adhesive that may be used is sold under the tradename Loctite® 334.

FIG. 1 illustrates a brake system 2 including a caliper 4 movably connected to a support bracket 6. The support bracket 6 connects the brake system to a knuckle of a vehicle (not shown). The caliper 4 includes a piston bore 8. The piston bore 8 includes a piston bore axis 18.

Figure 2:
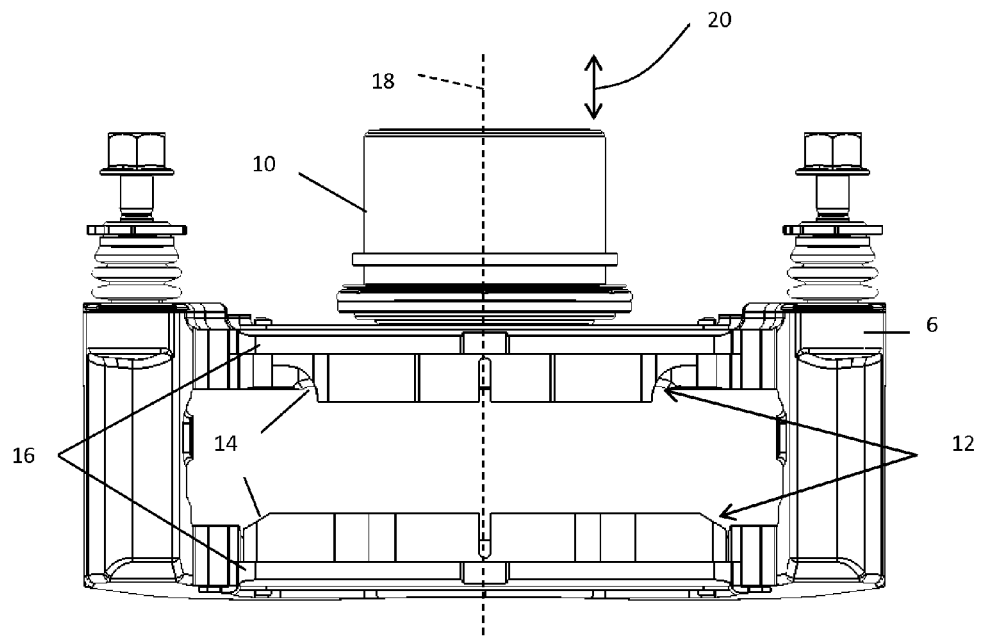
FIG. 2 illustrates a top view of a brake system with the caliper removed.

FIG. 2 illustrates a top view of the brake system of FIG. 1 with the caliper removed. A pair of opposing brake pads 12 that each include a pressure plate 16 and friction material 14 are located within the support bracket 6. A piston 10 is in contact with one of the brake pads 12 and the piston 10 is movable in the direction 20 along the piston bore axis 18.

Figure 3:
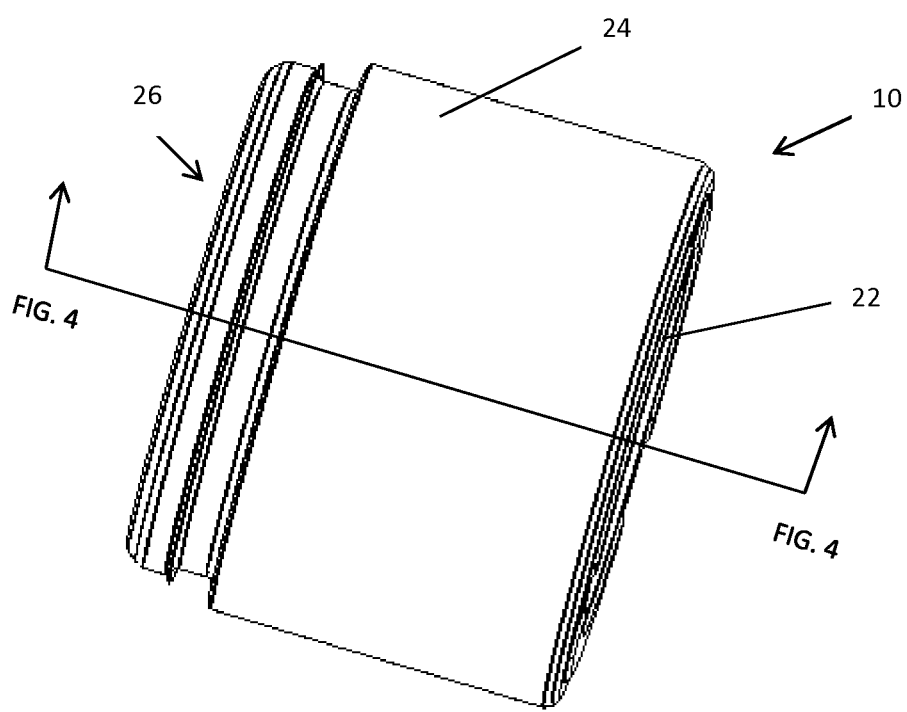
FIG. 3 illustrates a perspective view of a piston.

FIG. 3 is a close-up view of a piston 10. The piston 10 includes a rear wall 22 connected to a side wall 24 that is cylindrical in shape and defines a front opening 26 in the piston 10.

Figure 4:
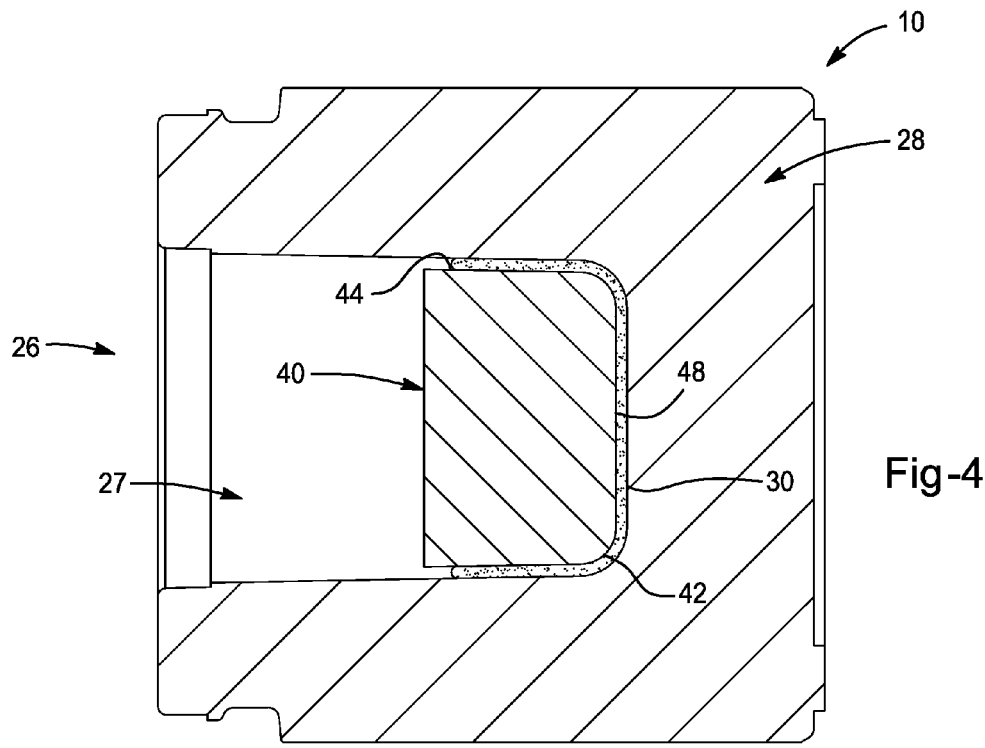
FIG. 4 illustrates a cross-sectional view of the piston of FIG. 3 including an insert.

FIG. 4 a cross-sectional view of the piston 10 of FIG. 4. The piston 10 includes an insert 40 located within the recess 27 (i.e., pocket). The insert 40 mirrors the shape of the opening 26 in the front of the piston 10. The insert 40 is connected to the piston 10 by an adhesive 30. The adhesive 30 extends between a bottom wall 48 (which is cylindrical) and side wall 44 of the insert 40 and the opening 26 of the piston so that the insert 40 is fixedly connected within the piston 10. The piston 10 is made of a material with a first density 28 and the insert 40 is made of a material with a second density 42

Figure 5:
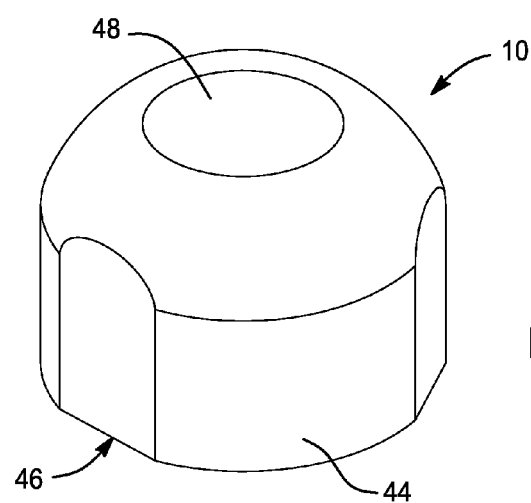
FIG. 5 illustrates an example of an insert.

FIG. 5 illustrates a perspective view of an insert 40. The insert 40 includes a bottom wall 48 and a side wall 44. The side wall 44 is cylindrical and includes indentations 46.

Figure 6:
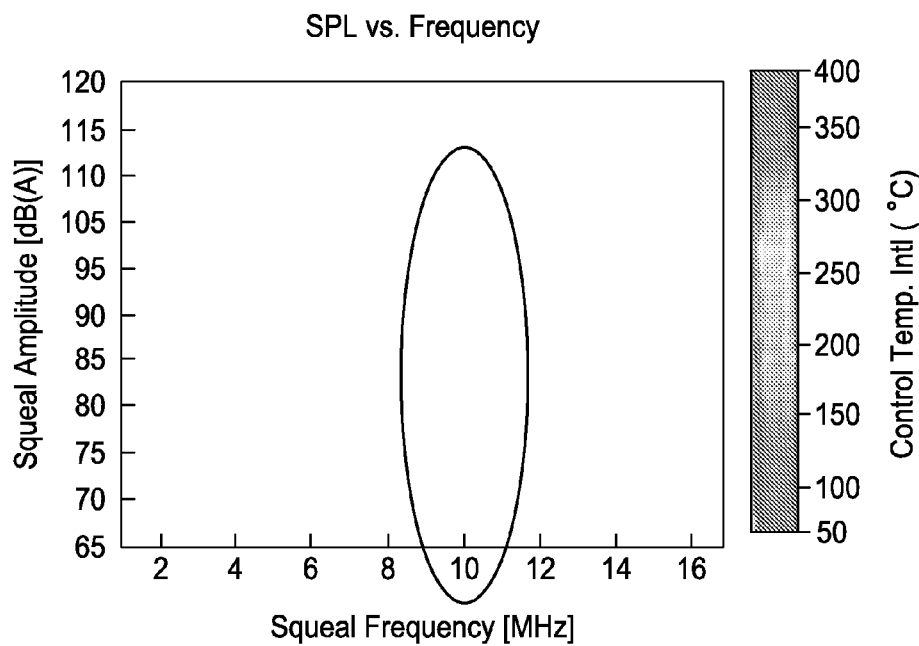
FIG. 6 illustrates an example of a phase mode over a frequency range generated by a piston of the teachings herein.

FIG. 6 illustrates a graph demonstrating a shift in frequency mode and no squeal generated by the brake system within a frequency range. As illustrated, there is no squeal generated by the brake system during a brake apply and especially movement of the piston within the brake system during movement of the brake pads by the piston.

Figure 7:
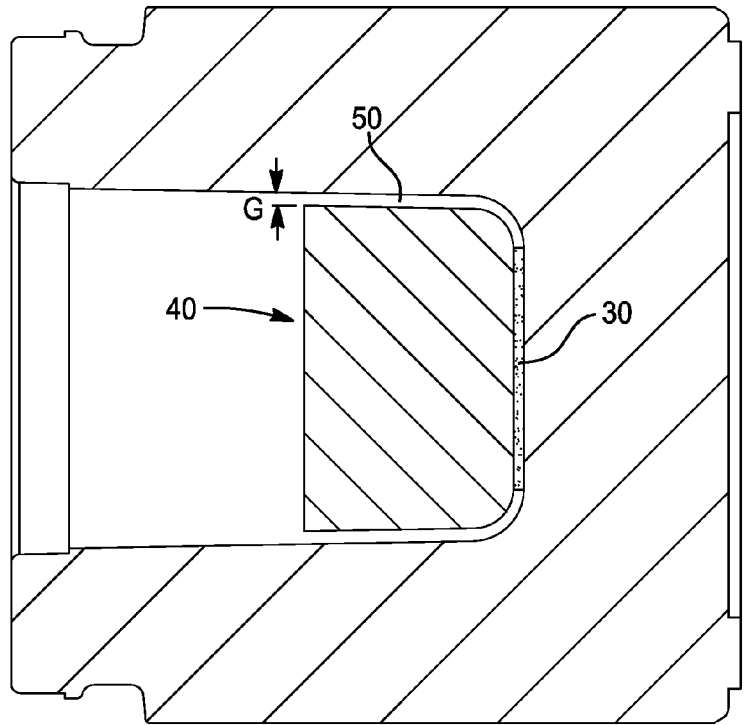
FIG. 7 illustrates a cross-sectional view of a connection between a piston and insert.

FIG. 7 illustrates a cross-sectional view of an insert 40 and piston 10. The insert 40 is connected to the piston 10 by an adhesive 30 that only contacts the bottom wall of the insert 40 and an upper portion of the piston recess. A gap (G) 50 is formed between an outer wall of the insert 40 and an inner wall of the piston 10, which permits the insert 40 to move within the piston 10 and relative to the piston.

Figure 8:
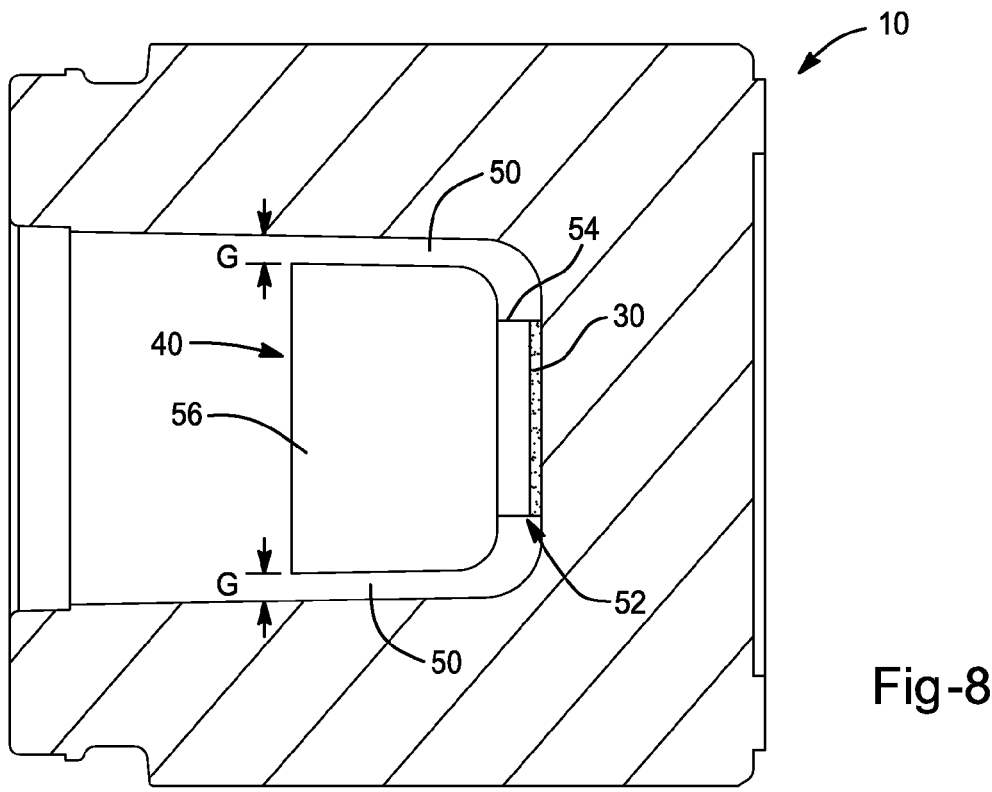
FIG. 8 illustrates a cross-sectional view of an insert located within a piston.

FIG. 8 illustrates a cross-sectional view of an insert 40 including a step 52 located within the piston 10. The step 52 of the insert 40 creates a base 54 that is smaller than a cap 56 so that if any adhesive 30 expands or moves the adhesive can expand or move into the step 52 without moving around an annular sidewall of the insert 40. The step 52 allows only the bottom of the insert 40 to be adhered to the piston 10 so that the insert 40 is locked within the piston 10 but can move relative to the piston 10 into the annular gap (G) 50 without contacting an annular sidewall of the piston 10.

Figure 9:
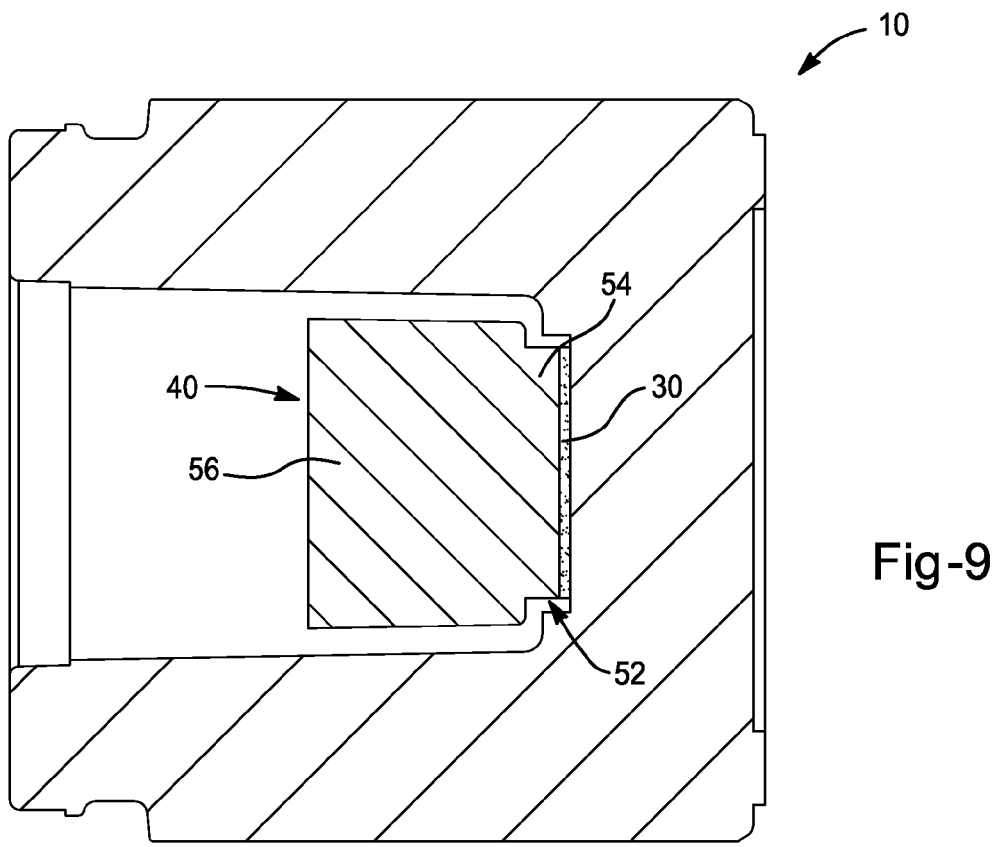
FIG. 9 illustrates a cross-sectional view of an insert located within a piston.

FIG. 9 illustrates a cross-sectional view of a piston 10 being contoured to center an insert 40 within the piston 10. The piston 10 has a retaining step 34 forming a cavity 32 for receiving a portion of the insert 40. The insert 40 includes a step 52 that forms a base 54 which fits into the cavity 32 and a cap 56 that extends above the cavity 32. The insert 40 and the piston 10 in the cavity 32 are in contact and connected together so that the insert 40 is connected to the piston 40.

Figure 10:
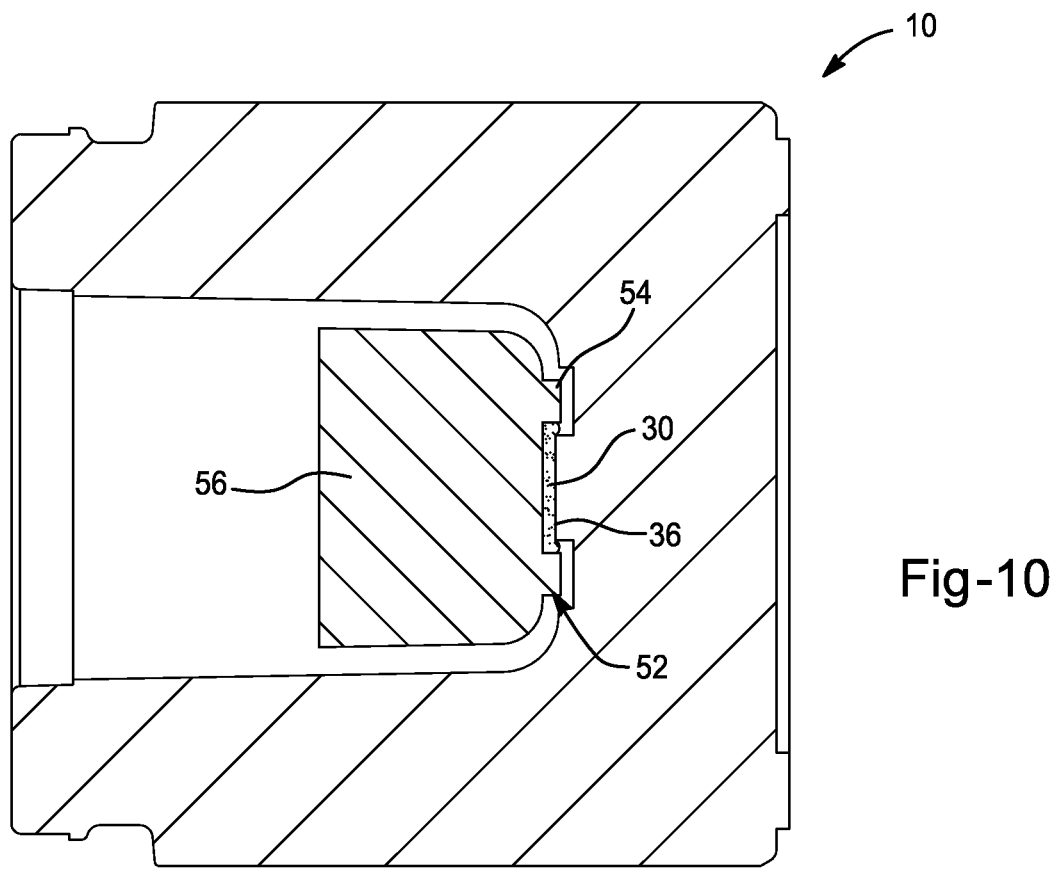
FIG. 10 illustrates a cross-sectional view of an insert located within a piston.

FIG. 10 illustrates a cross-sectional view of a piston 10 including a projection 36 for centering an insert 40 within the piston 10. A top of the projection 36 includes adhesive 30 that contacts a bottom of the insert 40 for connecting the insert 40 to the piston 10. The insert includes a step 52 that forms an annular ring for receiving the projection 36. The step 52 forms a base 54 with a cap 56 that extends above the base 54.

Any numerical values recited herein include all values from the lower value to the upper value in increments of one unit provided that there is a separation of at least 2 units between any lower value and any higher value. As an example, if it is stated that the amount of a component or a value of a process variable such as, for example, temperature, pressure, time and the like is, for example, from 1 to 90, preferably from 20 to 80, more preferably from 30 to 70, it is intended that values such as 15 to 85, 22 to 68, 43 to 51, 30 to 32 etc. are expressly enumerated in this specification. For values which are less than one, one unit is considered to be 0.0001, 0.001, 0.01 or 0.1 as appropriate. These are only examples of what is specifically intended and all possible combinations of numerical values between the lowest value and the highest value enumerated are to be considered to be expressly stated in this application in a similar manner. As can be seen, the teaching of amounts expressed as "parts by weight" herein also contemplates the same ranges expressed in terms of percent by weight. Thus, an expression in the Detailed Description of the Teachings of a range in terms of at "'x' parts by weight of the resulting polymeric blend composition" also contemplates a teaching of ranges of same recited amount of "x" in percent by weight of the resulting polymeric blend composition."

Unless otherwise stated, all ranges include both endpoints and all numbers between the endpoints. The use of "about" or "approximately" in connection with a range applies to both ends of the range. Thus, "about 20 to 30" is intended to cover "about 20 to about 30", inclusive of at least the specified endpoints.

The disclosures of all articles and references, including patent applications and publications, are incorporated by reference for all purposes. The term "consisting essentially of" to describe a combination shall include the elements, ingredients, components or steps identified, and such other elements ingredients, components or steps that do not materially affect the basic and novel characteristics of the combination. The use of the terms "comprising" or "including" to describe combinations of elements, ingredients, components or steps herein also contemplates embodiments that consist essentially of the elements, ingredients, components or steps.

Plural elements, ingredients, components or steps can be provided by a single integrated element, ingredient, component or step. Alternatively, a single integrated element, ingredient, component or step might be divided into separate plural elements, ingredients, components or steps. The disclosure of "a" or "one" to describe an element, ingredient, component or step is not intended to foreclose additional elements, ingredients, components or steps.

It is understood that the above description is intended to be illustrative and not restrictive. Many embodiments as well as many applications besides the examples provided will be apparent to those of skill in the art upon reading the above description. The scope of the teachings should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. The omission in the following claims of any aspect of subject matter that is disclosed herein is not a disclaimer of such subject matter, nor should it be regarded that the inventors did not consider such subject matter to be part of the disclosed inventive subject matter.

We claim:

1. A brake piston comprising:
   a. a rear wall;
   b. a cylindrical side wall connected to the rear wall;
   c. a recess located within the brake piston;
   d. an insert located within the recess of the brake piston; and
   e. an adhesive connecting the insert to the recess of the brake piston;
   wherein the insert is made of metal, and the adhesive is connected to a bottom of the insert and a top surface of the recess; and
   wherein the insert includes one or more steps that form a space between the top surface of the recess, the cylindrical side wall of the brake piston, or both.

2. The brake piston of claim 1, wherein the adhesive is only connected to the bottom of the insert and the top surface of the recess.

3. The brake piston of claim 1, wherein insert is free of the adhesive around an annular side wall.

4. The brake piston of claim 1, wherein the adhesive includes elastomeric characteristics, and the adhesive retains the elastomeric characteristics when the adhesive is cured.

5. The brake piston of claim 1, wherein the adhesive is a primerless adhesive.

6. The brake piston of claim 1, wherein the adhesive bonds two dissimilar materials together.

7. The brake piston of claim 1, wherein the adhesive is a silane modified polymer based adhesive, an acrylic based adhesive, or a combination of both.

8. The brake piston of claim 1, wherein the brake piston is made of a phenolic material and is substantially free of rubber or elastic materials.

9. The brake piston of claim 1, wherein the insert is made of steel.

10. The brake piston of claim 9, wherein the insert is free of elastic materials, rubber, or both.

11. The brake piston of claim 1, wherein the insert has a cylindrical side wall that includes one or more indentations.

12. The brake piston of claim 1, wherein a density of a material of the brake piston is less dense than a material of the insert.

13. The brake piston of claim 1, wherein the insert has a mass that is less than a mass of the brake piston.

14. The brake piston of claim 1, wherein the one or more steps may extend inward from a side wall of the insert so that the bottom of the insert including the one or more steps forms a base of the insert.

15. The brake piston of claim 14, wherein the insert includes a cap that is connected to and located above the base of the insert, and the one or more steps of the base form an annular ring with an outer ring surface that is smaller than the cap and an inner ring surface that forms a region that receives the adhesive connected to the bottom of the insert.

16. The brake piston of claim 2, wherein the piston includes a projection extending from the rear wall so that a top of the projection forms a top surface of the rear wall.

17. The brake piston of claim 16, wherein the adhesive is a silane modified polymer based adhesive, an acrylic based adhesive, or a combination of both.

18. A brake system comprising:
  a. a support bracket,
  b. a caliper in communication with the support bracket, the caliper including:
    one or more piston bores with each piston bore including one or more pistons, wherein the piston includes:
      i. a rear wall;
      ii. a cylindrical side wall connected to the rear wall;
      iii. a recess located within the brake piston;
      iv. a projection extending from the rear wall so that a top of the projection forms a top surface of the rear wall;
      v. an insert located within the recess of the brake piston; and
      vi. an adhesive connecting the insert to the recess of the brake piston;
    wherein the adhesive has elastic characteristics so that the adhesive permits the insert to move relative to the piston during a brake apply and the elastic characteristics are exhibited when the adhesive is cured, and the adhesive is connected to a bottom of the insert and the top surface of the projection;
    wherein the insert is made of metal and the piston is made of a phenolic material; and
    wherein the insert includes one or more steps that form a space between the top surface of the recess, the cylindrical side wall of the brake piston, or both.

19. The brake system of claim 18, wherein the recess has a volume and the insert fills about 20 percent or more of the volume.

20. The brake system of claim 18, wherein the insert includes a cap and the one or more steps may extend inward from a side wall of the insert so that the bottom of the insert including the one or more steps forms a base that is located below and connected to the cap, the one or more steps form an annular ring surface with an outer ring surface that extends inward from the side wall of the insert and an inner ring surface that forms a region that receives the adhesive connected to the bottom of the insert, and
    wherein one or more retaining steps are located on the rear wall of the piston around the projection so that any excess adhesive flows into the one or more retaining steps.

* * * * *